United States Patent [19]

Schaeffer

[11] Patent Number: 4,859,118
[45] Date of Patent: Aug. 22, 1989

[54] MINE ROOF SUPPORT ANCHOR AND PROCESS FOR INSTALLING THE SAME

[75] Inventor: Charles W. Schaeffer, Lebanon, Pa.

[73] Assignee: Birmingham Bolt Company, Inc., Birmingham, Ala.

[21] Appl. No.: 209,378

[22] Filed: Jun. 21, 1988

[51] Int. Cl.⁴ .................. E02D 20/00; F16B 13/04
[52] U.S. Cl. ................................ 405/259; 411/78; 411/79
[58] Field of Search ............ 411/47, 63, 64, 66, 411/79, 80, 78; 405/259

[56] References Cited

U.S. PATENT DOCUMENTS

| | | | |
|---|---|---|---|
| 1,993,749 | 3/1935 | Pleister | 411/76 |
| 2,878,709 | 3/1959 | Horvath | 411/47 X |
| 3,181,414 | 5/1965 | Dickow | 411/47 |
| 3,188,815 | 6/1965 | Schuermann et al. | 405/261 |
| 3,221,590 | 12/1965 | Dickow | 411/47 |
| 3,342,097 | 9/1967 | Rocheleau | 411/76 |
| 4,275,637 | 6/1981 | Herb et al. | 411/78 |
| 4,556,344 | 12/1985 | White | 405/259 X |
| 4,605,350 | 8/1986 | Chater et al. | 411/75 |

FOREIGN PATENT DOCUMENTS 208951 6/1957 Australia ................ 411/80

Primary Examiner—Randolph A. Reese
Assistant Examiner—Arlen L. Olsen
Attorney, Agent, or Firm—Shlesinger & Myers

[57] ABSTRACT

A mine roof support anchor and process for installing the same. The anchor comprises a pair of wedge members, each of which has tapered surfaces adapted for interengagement to effect expansion of the shell into gripping engagement with the mine roof. The wedge members are joined by a connector at one end thereof. Upon threading the roof bolt through one wedge member, the upper end of the bolt engages the connector, thereby effecting upper movement of the other wedge member and downward movement of the one wedge member, causing rapid expansion of the shell. External ribs on one of the wedge members engage the mine roof after partial expansion of the shell to limit upward movement of the wedge member. A vertical rib on the wedge member through which the roof bolt is threaded prevents rotation thereof during the rotation of the bolt through the anchor.

19 Claims, 2 Drawing Sheets

MINE ROOF SUPPORT ANCHOR AND PROCESS FOR INSTALLING THE SAME

BACKGROUND OF THE INVENTION

In the field of mine roof bolting, many methods and types of anchors are presently in use. They fall into several general categories and include a mechanical system, a combination mechanical and resin system, a resin point anchor system, a fully grouted tension system and a non-tension fully grouted system. The use of any particular system is predicated upon a number of considerations including the integrity of the strata at the anchoring horizon, the condition of the roof being supported, etc.

In mines where the roof is very difficult to support, there is a trend toward the use of an anchor which will withstand much higher bolt tension loads than was thought practical and necessary in the past. This increase in the tension and roof bolting has resulted in the most marked improvement in roof control since the beginning of roof bolting in mines. The new anchors, called "point anchors" are usually encapsulated in resin as they are tightened. The resin adds to the stability of the anchor, but its main advantge is in maintaining the initial installed tension.

For effecting maximum tension loads, it is also desirable to drill small bore holes for roof bolts, but to use the largest diameter roof bolt possible that can be anchored in the hole. Up to the present time, however, the size of the roof bolts has been necessarily limited due to space limitations created by conventional expansion shells.

SUMMARY OF THE INVENTION

The mine roof support anchor of the present invention is a two piece rock bolt anchor capable of sustaining very high bolt loads heretofore considered impractical, and permitting use of a larger diameter roof bolt in a mine roof hole than has heretofore been possible.

The roof support anchor comprises a pair of wedge members, each of which has tapered surfaces adapted for interengagement to effect expansion of the shell into gripping engagement with the mine roof.

The wedge members are joined by a connector at one end thereof, which connector lies in the path of movement of a roof bolt which is threaded through one of the wedge members. Upon threading of the roof bolt through the one wedge member, the upper end of the roof bolt engages the connector, thereby effecting upward movement of the other wedge member and substantially contemporaneous downward movement of the one wedge member, causing rapid engagement of the tapering surfaces and resulting expansion of the shell.

The support anchor of the present invention further includes external ribs on one of the wedge members which are adapted to engage the mine roof after partial expansion of the shell to limit the upward movement of the wedge member during the tightening of the anchor in the mine roof opening.

The anchor further includes a vertical rib on the wedge member through which the roof bolt is threaded, for engagement with the mine roof to prevent rotation thereof during the rotation of the bolt through the anchor.

A principal advantage of the support anchor of the present invention is its versatility in adapting the same for use in different anchoring system and in mine roof openings of various sizes The same anchor can be used on larger size bolts without increasing the bore hole diameter due to the two piece construction and slightly eccentric location of the threads in one of the wedge members.

DESCRIPTION OF FIGURES OF THE DRAWINGS

FIGS. 5 to 8 are side elevational views of the mine roof support anchor of the present invention installed in a mine roof opening, and showing the successive steps of installation of the anchor in the mine roof opening.

DETAILED DESCRIPTION OF THE INVENTION

Figure 2:
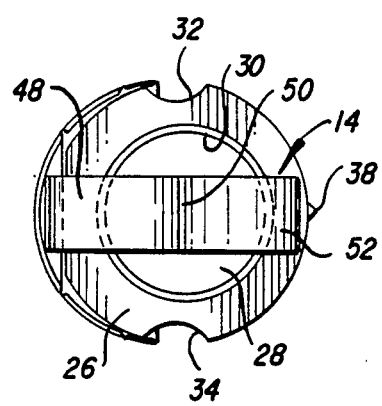
FIG. 2 is a top plan view thereof.

As shown to advantage in FIGS. 1 to 4, the mine roof support anchor of the present invention generally comprises a pair of wedge members designated 10 and 12 which are joined together at one end in spaced, longitudinally offset relationship by a connector 14.

Wedge member 10 includes a body portion 16 of generally semi-circular cross section, which gradually increases in size from the top to the bottom thereof, thereby forming a smooth tapered surface 18.

The outer periphery of body portion 16 is provided with spaced horizontal ribs 20, 22 and 24 for gripping engagement with the mine roof in a manner which will be more fully set out.

Wedge member 12 is of generally cylindrical shape and includes a body portion 26 having an eccentric bore 28 extending axially therethrough, a portion of which bore is threaded at 30.

The outer periphery of body portion 26 is provided with longitudinal grooves 32 and 34 to provide a passageway to permit gravitation of resin downwardly around the outer periphery of the anchor when it is used in a combination mechanical and resin system. One side of body portion 26 is provided with a tapering surface 36 which, as shown in FIG. 1, complements, and is positioned in spaced relation to tapering surface 18 of wedge member 10.

A vertically disposed rib 38 is fixed to the outer periphery of wedge member 12 in opposed relation to tapered surface 36, for purposes which will be hereinafter more fully set out.

Connector 14 is of generally inverted U-shape and includes leg portions 40 and 42, the lower ends of which are connected to wedge members 10 and 12 respectively as indicated at 44 and 46. The upper ends of legs 40 and 42 are joined by an intermediate portion which comprises a generally flat section 48, a central depressed section 50 and a sinuous section 52.

Figure 1:
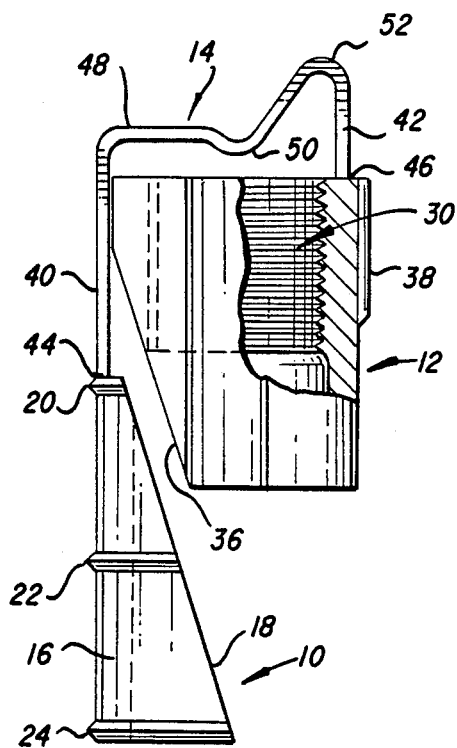
FIG. 1 is a side elevational view of the mine roof support anchor of the present invention, a portion thereof being broken away to disclose details of construction.
Figure 4:
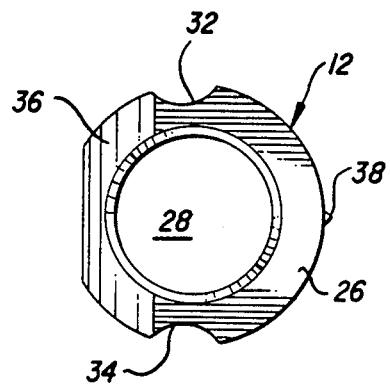
FIG. 4 is a bottom plan view of a second wedge member forming a part of the present invention.
Figure 3:
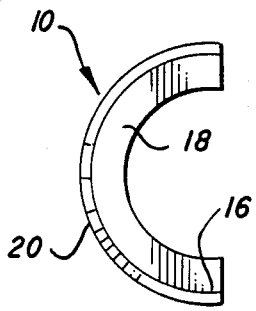
FIG. 3 is a bottom elevational view of one of the wedge members forming a part of the present invention.
Figure 9:
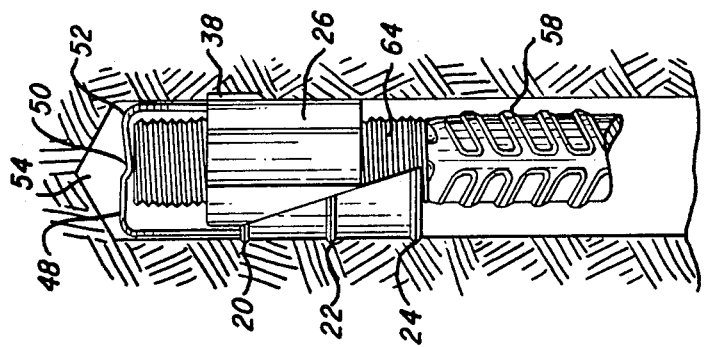

As shown to advantage in FIG. 1, connector 14 joins wedge members 10 and 12 together in a manner to hold the tapered surfaces of the two wedge members in spaced, partially longitudinally offset, relationship to each other.

OPERATION

In FIGS. 5 to 8, there is illustrated the installation of the mine roof support anchor of the present invention in an opening 54 of a mine roof 56. As illustrated in FIG. 5, the mine roof support anchor of the present invention includes a conventional mine roof bolt generally designated 58. Bolt 58 is provided at one end with a head 60 and a washer 62, the opposite end thereof being threaded at 64 for threaded engagement with threads 30 of wedge member 12. A mine roof support plate is indicated at 66.

As illustrated in FIG. 5, roof bolt 58 is threaded through wedge member 12 until the upper end thereof engages depressed section 50 of connector 14. At this time, ribs 20, 22 and 24 of wedge member 10 and rib 38 of wedge member 12 are proximate that portion of mine roof 56 defining opening 54.

Upon rotation of threaded bolt 58, it is advanced through wedge member 12 and the upper end of the bolt engages depressed portion 50 of connector 14. This produces a "seesaw" effect, causing wedge member 10, connector leg 40 and connector portion 48 to be raised upwardly.

Figure 6:
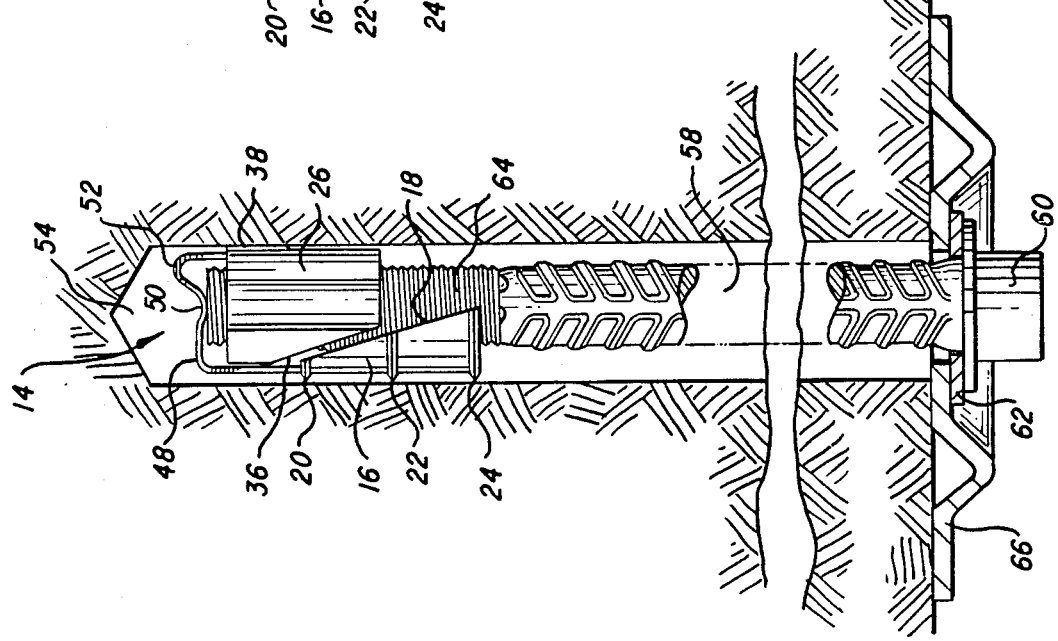

As shown to advantage in FIG. 6, as wedge member 10 is raised upwardly, there is a corresponding lowering of wedge member 12, leg 42 and sinuous section 52 of connector 14.

Figure 7:
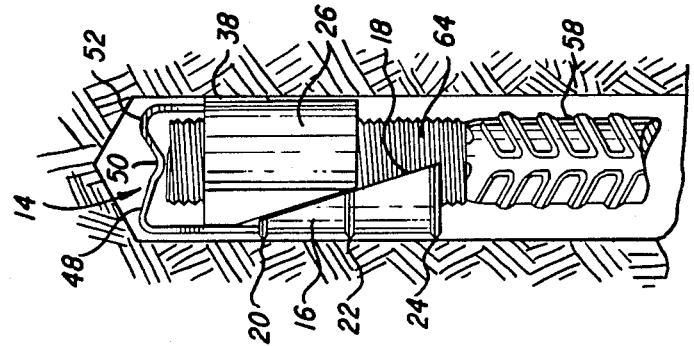

As shown in FIG. 7, the continued rotation of bolt 58, with resultant upward movement of wedge member 10 and downward movement of wedge member 12, effects sliding engagement of tapered surfaces 18 and 36 of wedge members 10 and 12, thereby producing outward movement of the wedge members until ribs 20, 22 and 24 of wedge member 10 dig into the mine roof 56 to positively preclude any further vertical movement of wedge member 10.

Figure 8:
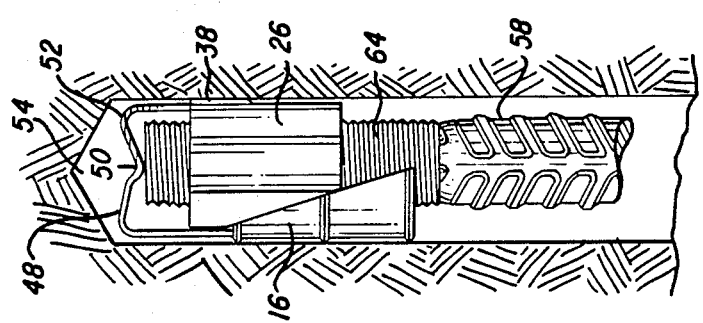

Rotation of bolt 58 is continued, and vertical rib 38 of wedge member 12 bites into roof 56 to prevent rotation of the expansion shell with the roof bolt, thereby insuring continued tensioning of the shell until the desired tightening thereof has been effected, as shown in FIG. 8. At this time, connector 14 may fail by breaking or being distorted out of shape.

In actual use, it has been found that optimum results are obtained where the angle of tapering surface 36 of wedge member 12 is 1°0 greater than the tapering wedge of wedge member 10 in order to eliminate the possibility of the leading edge of wedge member 12 biting into tapering surface 18 of wedge member 10. Although tapered surfaces 18 and 36 may be of differing angularity, optimum results have been obtained when tapering surface 18 of wedge member 10 is 17° and tapering 36 of wedge member 12 is 18°.

The wide spacing of horizontal ribs 20, 22 and 24 presents minimum contact area during initial tightening, allowing wedge member 10 to bite into the surrounding medium to develop maximum grip when full depth penetration and full contact has been generated. Superior force propagation into the anchoring strata is provided with ribs having a 90° tooth form.

By virtue of the structure of the present support anchor, a ⅝" roof bolt, for example, can be installed on a ⅞" diameter bore hole, as opposed to the prior use of a ¾" roof bolt in the same size hole, due to space limitations created by conventional shells.

The present support anchor is also versatile and readily adapted for use in mechanical, combination mechanical and resin, point anchor, and tensioned fully grouted systems.

While there has been herein shown and described the presently preferred form of this invention, it is to be understood that such has been done for purposes of illustration only and that various changes may be made therein within the scope of the appended claims.

What is claimed is:

1. A process for installing an expansion shell in a mine roof opening, the shell being of the type comprising a pair of interconnected wedge members having tapered, interengaging surfaces to effect expansion thereof upon sliding engagement of one tapered surface over the other, comprising the steps of
   (a) arranging the interconnected wedge members in interconnected spaced, longitudinally offset, relationship;
   (b) threading a roof bolt through one of the interconnected wedge members, and
   (c) substantially contemporaneously effecting upward movement of the other wedge member, and downward movement of the one wedge member, thereby producing sliding movement of the tapered surface of one wedge member over the tapered surface of the other wedge member, whereby the expansion shell is expanded into gripping engagement with the mine roof.
2. The process of claim 1, with the additional step of
   (a) preventing further upward movement of the other wedge member after partial expansion of the shell.
3. The process of claim 2, wherein
   (a) further upward movement of the other wedge member is prevented by fixed engagement of a part of the other wedge member with the mine roof.
4. The process of claim 3, with the additional step of
   (a) preventing rotational movement of the one wedge member while the roof bolt is threaded therethrough.
5. The process of claim 4, wherein
   (a) rotational movement of the one wedge member is prevented by fixed engagement of a part of the one wedge member with the mine roof.
6. A process for installing an expansion shell in a mine roof opening, the shell being of the type comprising a pair of wedge members having tapered, interengaging surfaces to effect expansion thereof upon sliding engagement of one tapered surface over the other, comprising the steps of
   (a) arranging the wedge members in interconnected, spaced, longitudinally offset, relationship;
   (b) threading a roof bolt through one of the wedge members;
   (c) continuously rotating the roof bolt to substantially contemporaneously effect downward movement of the one wedge member, and upward movement of the other wedge member, thereby producing sliding movement of the tapered surface of one wedge member over the tapered surface of the other wedge member, whereby the expansion shell is expanded into gripping engagement with the mine roof;
   (d) limiting the downward movement of the one wedge member by fixed engagement of a part thereof with the mine roof, after partial expansion of the shell, and
   (e) preventing rotational movement of the other wedge member by fixed engagement thereof with the mine roof during rotation of the roof bolt therethrough.

7. A mine roof support anchor comprising a roof bolt and expansion shell, said expansion shell including
(a) a pair of wedge members, each having tapered surfaces initially positioned in spaced relationship;
(b) one of said wedge members having a threaded bore for threaded engagement with said roof bolt;
(c) a connector joining adjacent ends of said wedge members and engaged by an end of said roof bolt as it is threaded through said one wedge member, and
(d) means for effecting upward movement of the other of said wedge members and downward movement of said one wedge member to cause sliding movement of the tapered surfaces of said wedge members upon threaded engagement of said roof bolt through said one wedge member to effect expanding movement of said expansion shell into gripping engagement with the mine roof.

8. The mine roof support anchor of claim 7, wherein
(a) said connector comprises a strap of generally inverted U-shape and having leg portions, the upper ends of which are joined by an intermediate portion;
(b) the lower ends of said strap being fixed to said wedge members and the intermediate portion thereof overlying said wedge members and lying in the path of said elongated bolt.

9. The mine roof support anchor of claim 8, wherein
(a) the central part of the intermediate portion of said strap is depressed to provide a pivot point initially contacted by said roof bolt.

10. The mine roof support anchor of claim 9, wherein
(a) the part of the intermediate portion of the strap principally overlaying said other wedge member is substantially flat and in proximate relation to said other wedge member and an end of said roof bolt.

11. The mine roof support anchor of claim 10, wherein
(a) the part of the intermediate portion of the strap principally overlying said one wedge member is of sinuous shape, whereby the part of the intermediate portion of the strap overlying said other wedge member is engaged by said roof bolt to effect raising thereof, while the threading of the roof bolt through said one wedge member effects downward movement of the latter, thereby effecting outward movement of said expansion shell into gripping engagement with the mine roof.

12. The mine roof support anchor of claim 11, with the addition of
(a) a first means on the outer periphery of said other wedge member for grippingly engaging the mine roof to prevent vertical movement thereof.

13. The mine roof support anchor of claim 12, wherein
(a) said first means comprises at least one horizontal disposed rib.

14. The mine roof support anchor of claim 13, wherein
(a) said rib forms an angle of approximately 90° for maximum engagement with the mine roof.

15. The mine roof support anchor of claim 14, wherein
(a) said first means comprises a plurality of spaced, horizontally disposed ribs.

16. The mine roof support anchor of claim 11, with the addition of
(a) a second means on the outer periphery of said one wedge member for grippingly engaging the mine roof to prevent rotational movement thereof.

17. The mine roof support anchor of claim 16, wherein
(a) said second means comprises a vertically disposed rib.

18. The mine roof anchor of claim 10, wherein
(a) said pair of wedge members are initially positioned in longitudinally offset relationship;
(b) the wedge angles of said one wedge member being slightly larger than that of the other wedge member to prevent the leading edge of the one wedge member from biting into the tapered surface of the other wedge member.

19. The mine roof anchor of claim 18, wherein
(a) the wedge angle of said wedge members is approximately 18° and 17° respectively.

* * * * *